United States Patent
Li et al.

(10) Patent No.: US 11,324,049 B2
(45) Date of Patent: May 3, 2022

(54) METHODS AND APPARATUS FOR RANDOM ACCESS IN MULTI-CARRIER COMMUNICATION SYSTEMS

(71) Applicant: Neo Wireless LLC, Wayne, PA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: NEO WIRELESS LLC, Wayne, PA (US)

( * ) Notice: Subject to any disclaimer, the term of this patent is extended or adjusted under 35 U.S.C. 154(b) by 0 days.

(21) Appl. No.: 16/544,201

(22) Filed: Aug. 19, 2019

(65) Prior Publication Data

US 2020/0187257 A1 Jun. 11, 2020

Related U.S. Application Data

(63) Continuation of application No. 15/425,735, filed on Feb. 6, 2017, now Pat. No. 10,390,369, which is a
(Continued)

(51) Int. Cl.
*H04W 4/00* (2018.01)
*H04W 74/08* (2009.01)
(Continued)

(52) U.S. Cl.
CPC ..... *H04W 74/0833* (2013.01); *H04L 27/2608* (2013.01); *H04L 27/2613* (2013.01);
(Continued)

(58) Field of Classification Search
CPC ............. H04W 72/0446; H04W 88/08; H04W 72/0453; H04W 74/0833; H04L 27/2608; H04L 27/2613; H04L 27/2602
See application file for complete search history.

(56) References Cited

U.S. PATENT DOCUMENTS 4,977,593 A 12/1990 Ballance
5,598,154 A 1/1997 Wilson et al.
(Continued)

FOREIGN PATENT DOCUMENTS

KR 20050015119 2/2005
KR 100585233 5/2006
(Continued)

OTHER PUBLICATIONS

International Search Report and Written Opinion; International Patent Application No. PCT/US05/08169; Filed Mar. 9, 2005; Applicant: WalticaiSolutions, Inc.; dated Jun. 9, 2005; 9 pages.
(Continued)

*Primary Examiner* — Siren Wei
(74) *Attorney, Agent, or Firm* — Volpe Koenig

(57) ABSTRACT

Methods and apparatus in a multi-carrier cellular wireless network with random access improve receiving reliability and reduce interference of uplink orthogonal frequency division multiplex (OFDM) signals of a random access, while improving the detection performance of a base station receiver by employing specifically configured ranging signals. The OFDM signals of the random access are transmitted in a at least one block indicated in configuration information. Uplink signals are transmitted with a timing adjusted based on a received time advance and a power adjusted based on a received power adjustment.

28 Claims, 8 Drawing Sheets

Related U.S. Application Data continuation of application No. 13/899,226, filed on May 21, 2013, now Pat. No. 9,565,700, which is a continuation of application No. 13/205,579, filed on Aug. 8, 2011, now Pat. No. 8,467,366, which is a continuation of application No. 10/583,158, filed as application No. PCT/US2005/008169 on Mar. 9, 2005, now Pat. No. 7,995,967.

(60) Provisional application No. 60/551,589, filed on Mar. 9, 2004.

(51) Int. Cl.
*H04L 27/26* (2006.01)
*H04W 52/50* (2009.01)

(52) U.S. Cl.
CPC ......... *H04L 27/2602* (2013.01); *H04W 52/50* (2013.01); *H04W 74/08* (2013.01)

(56) References Cited

U.S. PATENT DOCUMENTS

| | | | |
|---|---|---|---|
| 5,726,978 A | 3/1998 | Frodigh et al. | |
| 5,898,338 A | 4/1999 | Proctor et al. | |
| 5,929,704 A | 7/1999 | Proctor, Jr. et al. | |
| 5,970,092 A * | 10/1999 | Currivan | H04L 25/03038 375/232 |
| 5,991,308 A | 11/1999 | Fuhrmann et al. | |
| 6,078,216 A | 6/2000 | Proctor, Jr. | |
| 6,101,179 A | 8/2000 | Soliman | |
| 6,144,711 A * | 11/2000 | Raleigh | H04B 7/0615 375/346 |
| 6,519,449 B1 | 2/2003 | Zhang et al. | |
| 6,535,547 B1 * | 3/2003 | Lyckegård | H04J 13/004 370/322 |
| 6,539,320 B1 | 3/2003 | Szajnowski et al. | |
| 6,600,772 B1 | 7/2003 | Zeira et al. | |
| 6,768,714 B1 * | 7/2004 | Heinonen | H04L 27/2662 370/208 |
| 6,839,876 B1 | 1/2005 | Tong et al. | |
| 7,263,058 B2 | 8/2007 | Joo | |
| 7,301,985 B1 | 11/2007 | Hall et al. | |
| 7,817,707 B2 | 10/2010 | Sohn et al. | |
| 7,995,967 B2 | 8/2011 | Li et al. | |
| 8,169,944 B2 * | 5/2012 | Walton | H04L 1/0017 370/313 |
| 8,199,632 B2 | 6/2012 | Geile et al. | |
| 10,638,468 B2 | 4/2020 | Nelson et al. | |
| 2002/0027957 A1 * | 3/2002 | Paulraj | H04L 1/06 375/267 |
| 2002/0154705 A1 * | 10/2002 | Walton | H04B 7/12 375/267 |
| 2002/0159537 A1 | 10/2002 | Crilly, Jr. | |
| 2003/0026324 A1 * | 2/2003 | Li | H04W 52/50 375/141 |
| 2003/0086371 A1 * | 5/2003 | Walton | H04L 1/0026 370/235 |
| 2003/0134656 A1 | 7/2003 | Chang et al. | |
| 2004/0001429 A1 | 1/2004 | Ma et al. | |
| 2004/0063450 A1 * | 4/2004 | Uhlik | H04W 74/008 455/517 |
| 2004/0114504 A1 | 6/2004 | Jung et al. | |
| 2004/0114566 A1 | 6/2004 | Lim et al. | |
| 2004/0141548 A1 | 7/2004 | Shattil | |
| 2004/0166886 A1 | 8/2004 | Laroia et al. | |
| 2004/0174845 A1 | 9/2004 | Koo et al. | |
| 2005/0030931 A1 | 2/2005 | Sung et al. | |
| 2005/0068886 A1 * | 3/2005 | Wang | H04L 27/2607 370/210 |
| 2005/0080576 A1 | 4/2005 | Dickerson et al. | |
| 2005/0185796 A1 | 8/2005 | Lablans | |
| 2010/0111017 A1 | 5/2010 | Um et al. | |
| 2011/0292881 A1 | 12/2011 | Li et al. | |

FOREIGN PATENT DOCUMENTS

| | | |
|---|---|---|
| KR | 20060055636 | 5/2006 |
| WO | 2000/035121 A1 | 6/2000 |
| WO | 2001/061880 A1 | 8/2001 |
| WO | 03/075500 | 9/2003 |

OTHER PUBLICATIONS

Notice of Allowance, U.S. Appl. No. 13/205,579, dated Mar. 6, 2013, Examiner A. Akinyemi, 14 pages.

*Neo Wireless LLC v. Dell Technologies Inc. et al.*, Defendants' Reply Claim Construction Brief, Civil Action No. 6:21-cv-0024 (Dec. 2, 2021).

*Neo Wireless LLC v. Dell Technologies Inc. et al.*, Supplemental Declaration of James Proctor in Support of Defendants' Reply Claim Construction Brief, Civil Action No. 6:21-cv-0024 (Dec. 2, 2021).

*Neo Wireless LLC v. Dell Technologies Inc. et al.*, Plaintiff Neo Wireless LLC's Claim Construction Sur Reply Brief, Civil Action No. 6:21-cv-0024 (Dec. 16, 2021).

*Neo Wireless LLC v. Dell Technologies Inc. et al.*, Joint Claim Construction Statement, Civil Action No. 3:21-cv-0024 (Dec. 21, 2021).

Definition of "guard band," McGraw Hill Dictionary of Scientific and Technical Terms, 6th edition (2003).

ETSI Special Mobile Group (SMG) Report of UMTS 30.06 V3.0.0; Universal Mobile Telecommunications System (UMTS); UMTS Terrestrial Radio Acces (UTRA); Concept evaluation (UMTS 30.06 version 3.0.0), TR 101 146 V3.0.0 (Dec. 1997).

Sklar, Digital Communications, Fundamentals and Applications, 2nd edition, Prentice Hall PTR, pp. 7-9 (2001).

Universal Mobile Telecommunications System (UMTS); UMTS Terrestrial Radio Acces (UTRA); Concept evaluation (UMTS 30.06 version 3.0.0), TR 101 146 V3.0.0 (Dec. 1997).

*Neo Wireless LLC v. Dell Technologies, Inc. et al.*, Plaintiffs First Amended Complaint, Civil Action No. 3:21-cv-0024 (Apr. 28, 2021).

*Dell Inc. et al., v. Neo Wireless LLC,* Declaration of Craig Bishop, Inter Partes Review of U.S. Pat. No. 8,467,366 and U.S. Pat. No. 10,833,908 (Sep. 2, 2021).

*Dell Inc. et al., v. Neo Wireless LLC,* Declaration of Dr. Matthew Valenti, Inter Partes Review of U.S. Pat. No. 8,467,366 (Sep. 15, 2021).

*Neo Wireless LLC v. LG Electronics, Inc. et al.*, Plaintiffs First Amended Complaint, Civil Action No. 6:21 -ov-0025 (Apr. 28, 2021).

*Dell Inc. et al., v. Neo Wireless LLC,* Petition for Inter Partes Review of U.S. Pat. No. 8,467,366 pursuant to 35 U.S C. §§ 311-319, 37 C.F.R. § 42 ((Sep. 16, 2021).

*Neo Wireless LLC v. Dell Technologies Inc. et al.*, Defendant's Answer, Affirmative Defenses, and Counterclaims to Plaintiffs First Amended Complaint, Civil Action No. 6:21-cv-0024 (Jun. 18, 2021).

*Neo Wireless LLC v. Dell Technologies Inc. et al.*, Neo Wireless's Answer to Dell's Counterclaims, Civil Action No. 6:21-cv-0024 (Jul. 9, 2021).

*Neo Wireless LLC v. Dell Technologies Inc. et al.*, Defendants' Opening Claim Construction Brief, Civil Action No. 6:21-cv-0024 (Oct. 28, 2021).

*Neo Wireless LLC v. Dell Technologies Inc. et al.*, Declaration of Roger Fulgham in Support of Defendants' Opening Claim Construction, Civil Action No. 6:21-cv-0024 (Oct. 28, 2021).

*Neo Wireless LLC v. Dell Technologies Inc. et al.*, Declaration of James Proctor in Support of Defendants' Opening Claim Construction Brief, Civil Action No. 6:21-cv-0024 (Oct. 27, 2021).

Van Nee et al., OFDM for Wireless Multimedia Communications, Artech House (2000).

*Neo Wireless LLC v. Dell Technologies Inc. et al.*, Stipulated Constructions, Civil Action No. 6:21-cv-0024 (Oct. 27, 2021).

(56) References Cited

OTHER PUBLICATIONS

*Neo Wireless LLC* v. *Dell Technologies Inc. et al.*, Plaintiff Neo Wireless LLC's Responsive Claim Construction Brief, Civil Action No. 6:21-cv-0024 (Nov. 18, 2021).
*Neo Wireless LLC* v. *Dell Technologies Inc. et al.*, Declaration of William Alberth in Support of Neo Wireless's Responsive Claim Construction Brief, Civil Action No. 6:21-cv-0024 (Nov. 18, 2021).
*Neo Wireless LLC* v. *Apple Inc.*, Apple Inc's Answer to Plaintiffs First Amended Complaint, Civil Action No. 6:21-cv-00026-ADA (Jun. 17, 2021).
*Neo Wireless LLC* v. *LG Electrincs Inc.*, Defendant LG's Answer to Plaintiffs First Amended Complaint, Civil Action No. 6:21-cv-00025-ADA (Jun. 17, 2021).
You et al., "A Simple Construction of OFDM-CDMA Signals with Low Peak-to-Average Power Ratio," IEEE Transactions on Broadcasting, vol. 49, No. 4 (Dec. 2003).Baxley et al., "Power Savings Analysis of Peak-to-Average Power Ratio Reduction in OFDM," IEEE Transactions on Consumer Electronics, vol. 50, No. 3 (Aug. 2004).
Baxley et al., "Power Savings Analysis of Peak-to-Average Power Ratio Reduction in OFDM," IEEE Transactions an Consumer Electronics, vol. 50, No. 3 (Aug. 2004).
Prasad, "Chapter 6—The Peak Power Problem," in OFDM for Wireless Communications Systems, Artech House (2004).
Panta et al., "Use of Peak-to-Average Power Reduction Technique in HIPERLAN2 and its Performance in a Fading Channel." Proc. 6th International Symposium on DSP for Communication Systems, pp. 113-117, (2002).
Guo et al., "Reducing Peak-to-Average Power Ratio in OFDM Systems by Adaptive Dynamic Range Companding," 2002 World Wireless Congress, San Francisco, CA (2002).
Koffman et al., "Broadband Wireless Access Solutions Based on OFDM Access in IEEE 802.16," IEEE Communications Magazine, pp. 96-103 (Apr. 2002).
Third Generation Partnership Project, "Technical Specification Group Radio Access Network; Physical layer procedures (FDD) (Release 5)," 3GPP TS 25.214 V5.7.0 (Dec. 2003).
*Neo Wireless LLC* v. *Apple Inc.*, Plaintiffs First Amended Complaint, Civil Action No. 6:21-cv-0026 (Apr. 28, 2021).
Neo Wireless LLC, Claim Chart—Claim 1 of U.S. Pat. No. 8,467,366, submitted with Plaintiffs First Amended Complaint, *Neo Wireless LLC* v *Dell, Inc. et al.*, Civil Action No. 6:21-cv-0024 (Apr. 28, 2021).
Third Generation Partnership Project, "Technical Specification Group Radio Access Network; Physical layer procedures (FDD) (Release 5)," 3GPP TS 25.214 V5.10.0 (Dec. 2004).
Third Generation Partnership Project, "Technical Specification Group Radio Access Network; Physical layer procedures (FDD) (Release 6)," 3GPP TS 25.214 V6.0.0 (Dec. 2003).
Third Generation Partnership Project, "Technical Specification Group Radio Access Network; Physical layer procedures (FDD) (Release 6)," 3GPP TS 25.214 V6.4.0 (Dec. 2004).
*Dell Inc. et al.*, v. *Neo Wireless LLC*, Decision Denying institution of Inter Partes Review of U.S. Pat. No. 8,467,366, IPR 2021-01480 (Mar. 16, 2022).

* cited by examiner

METHODS AND APPARATUS FOR RANDOM ACCESS IN MULTI-CARRIER COMMUNICATION SYSTEMS

CROSS-REFERENCE TO RELATED APPLICATION(S)

This application is a continuation of, and incorporates by reference in its entirety, U.S. patent application Ser. No. 15/425,735, entitled "METHODS AND APPARATUS FOR RANDOM ACCESS IN MULTI-CARRIER COMMUNICATION SYSTEMS", filed Feb. 6, 2017, which is a continuation of U.S. patent application Ser. No. 13/899,226, now U.S. Pat. No. 9,565,700, entitled "METHODS AND APPARATUS FOR RANDOM ACCESS IN MULTI-CARRIER COMMUNICATION SYSTEMS", filed May 21, 2013, which is a continuation of U.S. patent application Ser. No. 13/205,579, now U.S. Pat. No. 8,467,366, entitled "METHODS AND APPARATUS FOR RANDOM ACCESS IN MULTI-CARRIER COMMUNICATION SYSTEMS", filed Aug. 8, 2011, which is a continuation of U.S. patent application Ser. No. 10/583,158, now U.S. Pat. No. 7,995,967, entitled "METHODS AND APPARATUS FOR RANDOM ACCESS IN MULTI-CARRIER COMMUNICATION SYSTEMS", filed Aug. 27, 2008, which is a U.S. National Stage application of PCT/US05/08169, entitled "METHODS AND APPARATUS FOR RANDOM ACCESS IN MULTI-CARRIER COMMUNICATION SYSTEMS", filed Mar. 9, 2005, which claims the benefit of U.S. Provisional Patent Application No. 60/551,589, entitled "METHODS AND APPARATUS FOR RANDOM ACCESS IN MULTI-CARRIER COMMUNICATION SYSTEMS", filed Mar. 9, 2004.

BACKGROUND

In a wireless communication system, a mobile station first needs to perform a random access for establishing communication with a base station. The random access typically includes two steps: (1) Ranging and (2) Resource Request and Allocation. During Ranging, the mobile station sends a signal to the base station, so that the base station can identify the mobile station and measure the power and time delay of the mobile station, and inform the mobile station for power adjustment and time advance. During Resource Request and Allocation, the uplink and downlink resources for communication are requested and allocated. Ranging is a critical part of multi-carrier wireless communication system, and there are several important issues related to ranging:
1. The bandwidth efficiency of the ranging signals
2. The interference of ranging signal with other uplink signals
3. The detection performance and complexity at the base station receiver The ranging process typically involves an exchange of messages between the base station and the mobile station by which the mobile station aligns itself with the start of each time slot after compensating for propagation delay and other factors. One problem in a shared medium communication network involves the ranging of many mobile stations. When many mobile stations attempt to perform the ranging simultaneously, they are forced to contend for access to the shared channel and it becomes difficult for any of the mobile stations to complete the ranging process due to the large number of collisions. As a result, the time needed for all of the mobile stations to complete the ranging process is excessive, and much bandwidth on the shared channel is wasted.

DETAILED DESCRIPTION

In the following description, the invention is explained with respect to some of its various embodiments, and provides specific details for a thorough understanding. However, one skilled in the art will understand that the invention may be practiced without such details. In other instances, well-known structures and functions have not been shown or described in detail to avoid obscuring aspects of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The embodiments of this invention disclose methods and apparatus for random access in a multi-carrier system. In particular, ranging signals are designed to improve receiving reliability and to reduce interference with other uplink signals. Furthermore, methods and apparatus are described that improve the detection performance at the base station receiver.

In a multi-carrier communication system such as multi-carrier code division multiple access (MC-CDMA) and orthogonal frequency division multiple access (OFDMA) systems, information data are multiplexed on subcarriers that are mutually orthogonal in the frequency domain. In effect, a frequency selective channel is partitioned in frequency into a number of parallel, but small, segments that can be treated as flat fading channels and can employ simple one-tap equalizers. The modulation/demodulation can be performed using the fast Fourier transform (FFT).

In a multi-carrier communication system the physical media resource (e.g., radio or cable) can be divided in both the frequency and time domains. This canonical division provides a high flexibility and fine granularity for resource sharing. A basic structure of a multi-carrier signal in the frequency domain is made up of subcarriers, and within a particular spectral band or channel there are a fixed number of subcarriers. There are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard-bands and DC carriers.

Figure 1:
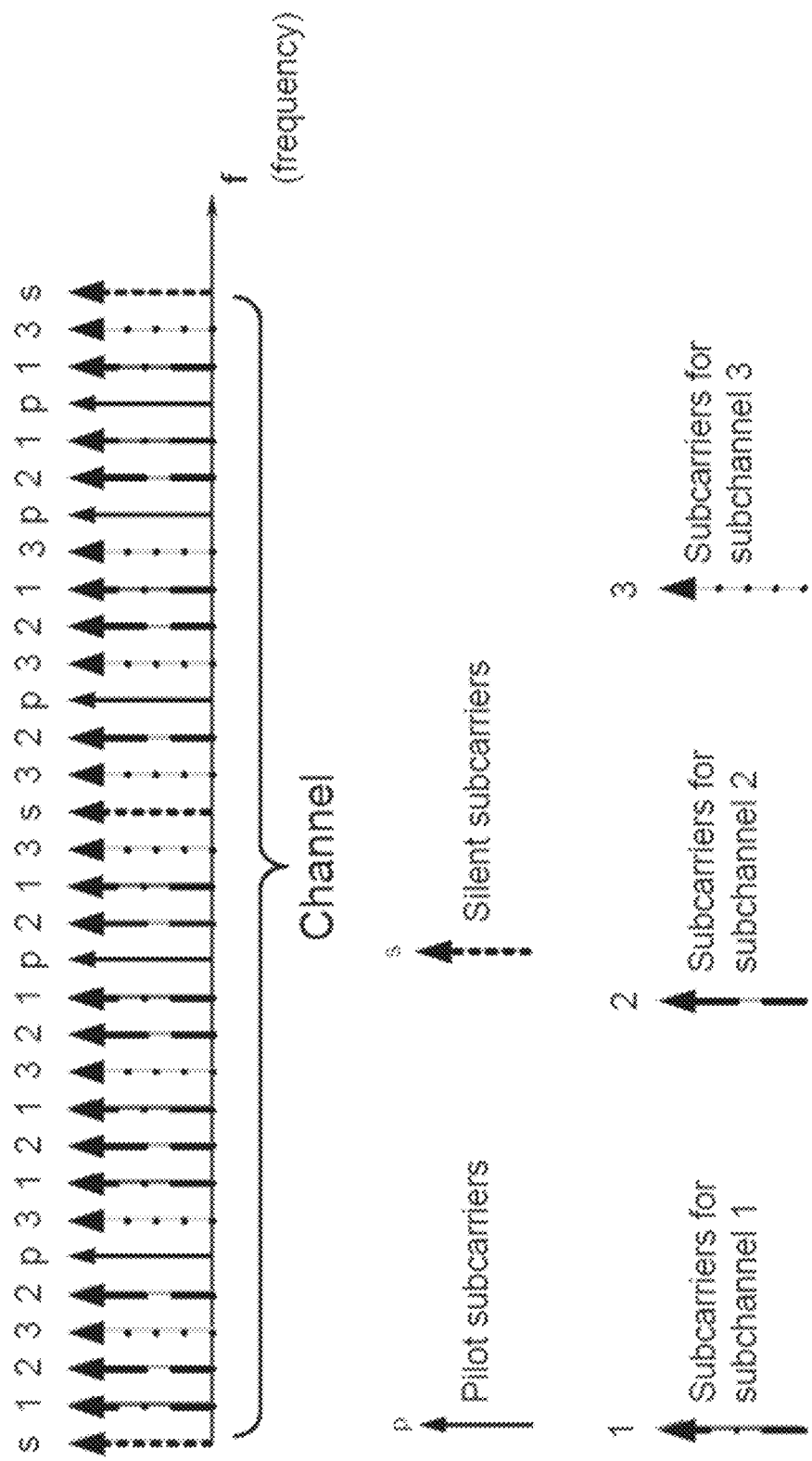
FIG. 1 depicts a basic structure of a multi-carrier signal in the frequency domain, made up of subcarriers.
Figure 2:
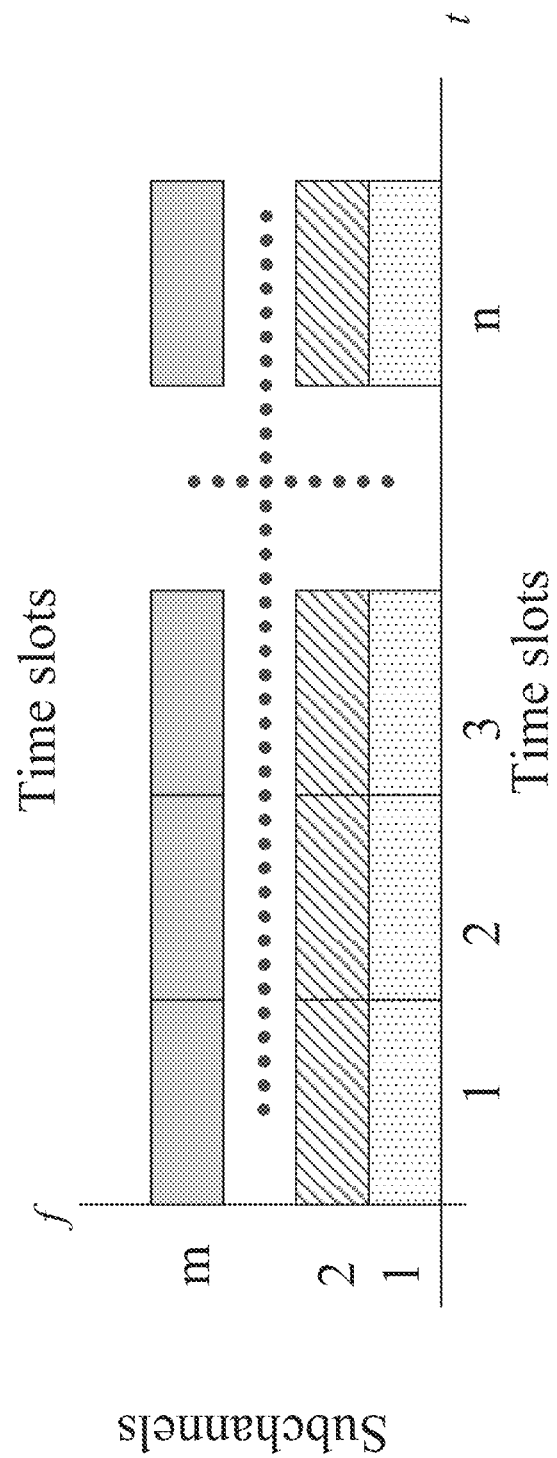
FIG. 2 shows a radio resource divided into small units in both the frequency domain (subchannels) and the time domain (time slots).

The data subcarriers can be arranged into groups called subchannels to support scalability and multiple-access. The carriers forming one subchannel are not necessarily adjacent to each other. Each user may use part or all of the subchannels. The concept is illustrated in FIG. 1 for the interleaved subchannels at the base station transmitter. Data subcarriers can be grouped into subchannels in a particular way and the pilot subcarriers are also distributed over the entire channel in a particular way. The basic structure of a multi-carrier signal in the time domain is made up of time slots to support multiple-access. The resource division in both the frequency and time domains is depicted in FIG. 2.

Figure 3:
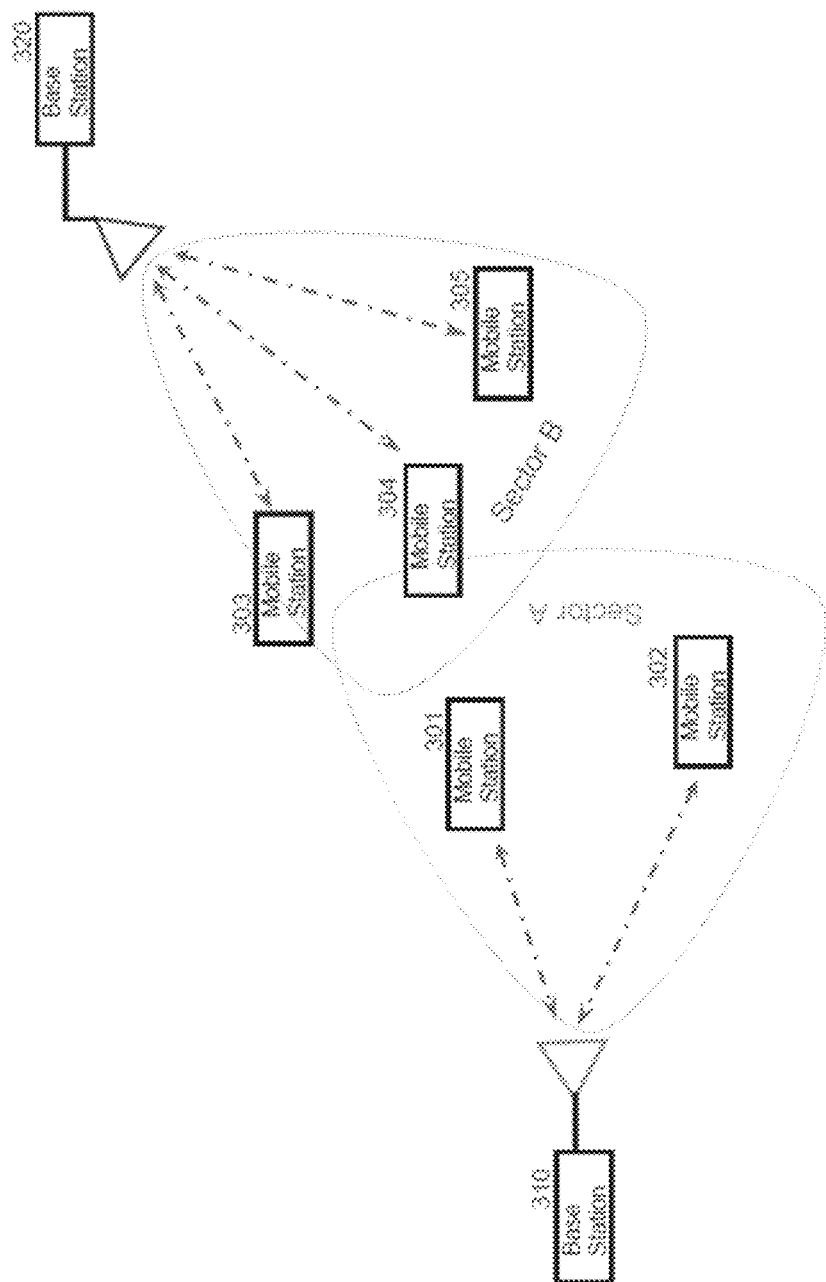
FIG. 3 shows a cellular system with at least one cell and one base station.

FIG. 3 illustrates a typical cellular structure. In this illustration no distinction is made between a cell and a sector. If a cell is divided into sectors, from a system engineering point of view each sector can be considered a cell. In this context, the terms "cell" and "sector" are interchangeable. Both of them are generally called a cell. In the communication system of FIG. 3 Base Station 310 is communicating with Mobile Stations 301 and 302 in Sector A of its cell site while Base Station 320 is communicating with Mobile Stations 303, 304, and 305 in Sector B of its cell site.

Figure 4:
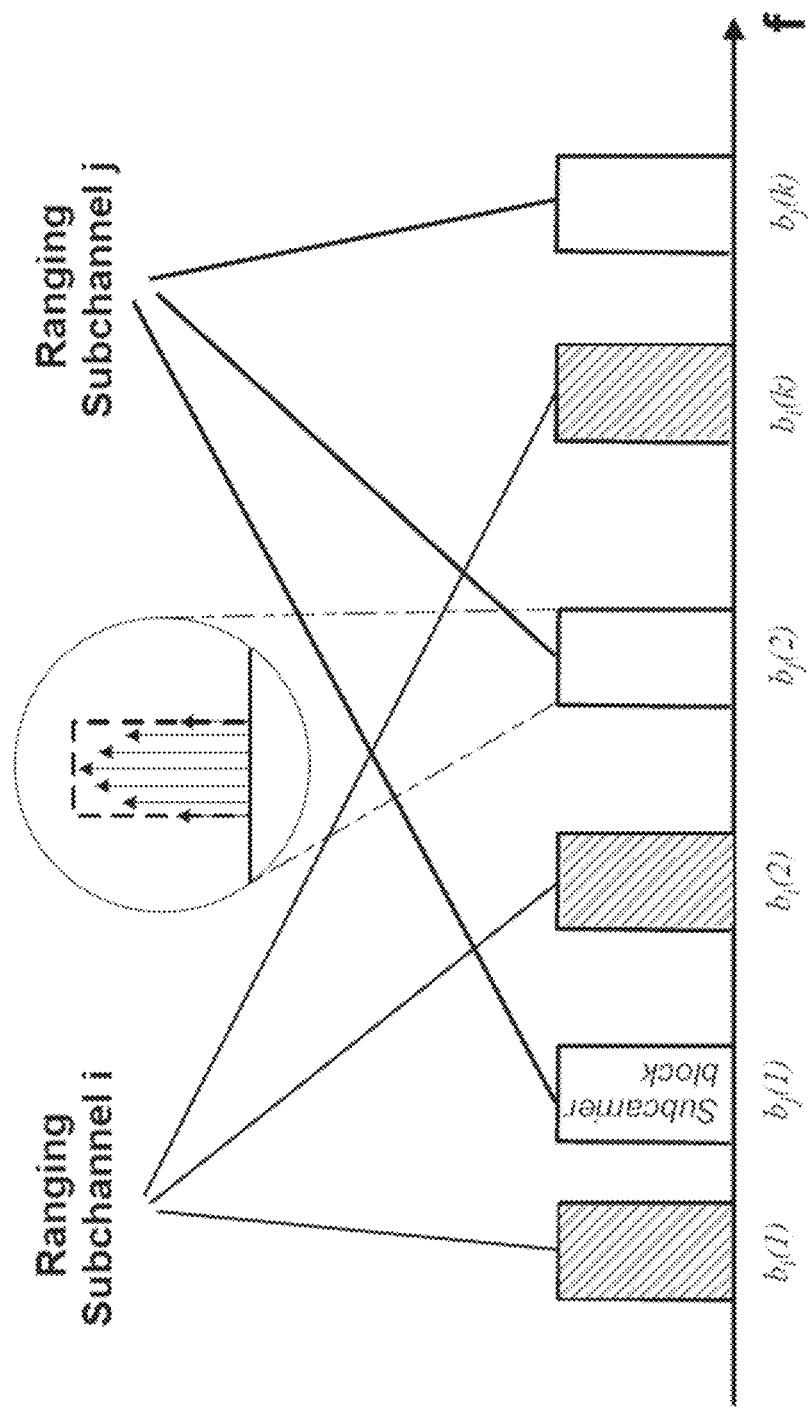
FIG. 4 depicts a ranging subchannel composed of at least one block of subcarriers.

FIG. 4 illustrates two ranging subchannels, each of which is composed of multiple blocks of subcarriers. The subcarriers in each block are contiguous in frequency. FIG. 4 schematically shows that the signal power of the subcarriers towards the boundary (the lower ends and the higher ends in frequency) of a block is lower than that of the subcarriers towards the center of the block. (In a special case, the power levels of the two subcarriers at both ends of a block are set to zero.) Because different factors may cause possible overlap of two subcarrier blocks from to different transmitters, the attenuated boundary subcarriers will minimize the resulting interference.

In accordance with aspects of some embodiments, the ranging signal is carried over a ranging subchannel that contains multiple subcarriers. Either binary or non-binary signals can be modulated on the subcarriers of a ranging subchannel.

The sequence of modulating signals in a ranging subchannel is called a ranging sequence. Multiple ranging sequences are permitted in a cell. A mobile station chooses a ranging sequence for random access and uses the sequence to identify itself in the initial communication with a base station. The period of a ranging signal is called a ranging slot. A ranging slot may last over one or multiple OFDM symbols. Multiple ranging slots can be provided to increase the random access opportunity and reduce the collision probability.

In one embodiment, different cells may have different subcarrier configurations for their ranging subchannels. Different cells may also have different ranging sequence sets. These differences may be used to identify the association of a mobile station with a cell.

Figure 5:
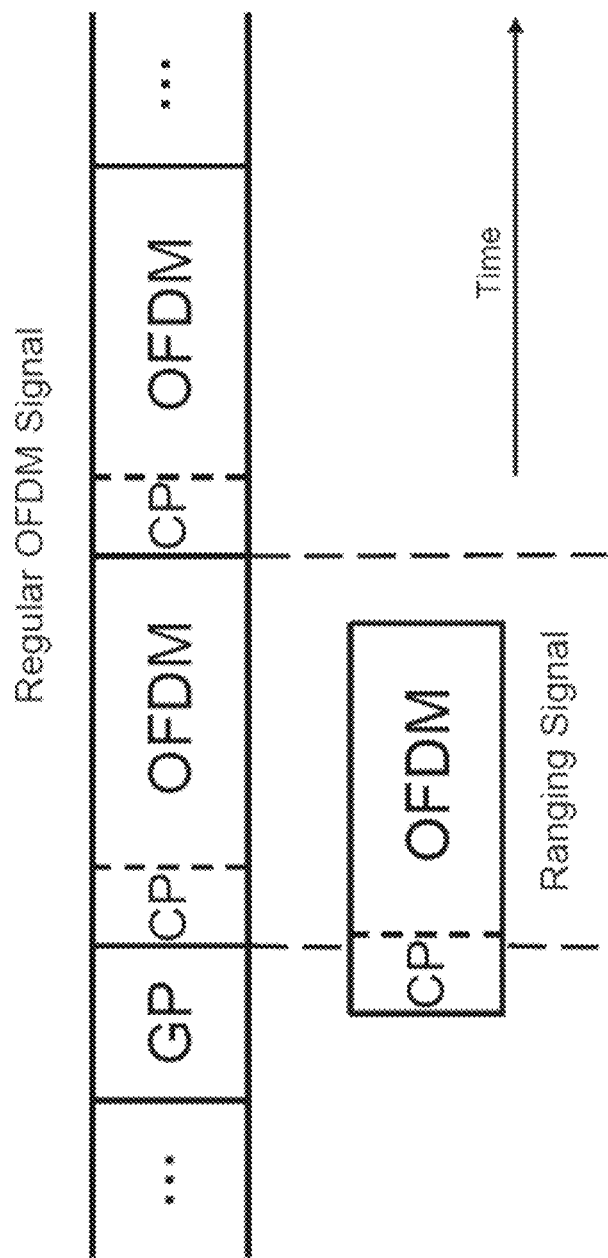
FIG. 5 illustrates a case of time misalignment in a ranging signal, with a base station OFDM time frame, due to uncertainty of a mobile station's round trip delay at an initial stage of random access.
Figure 6:
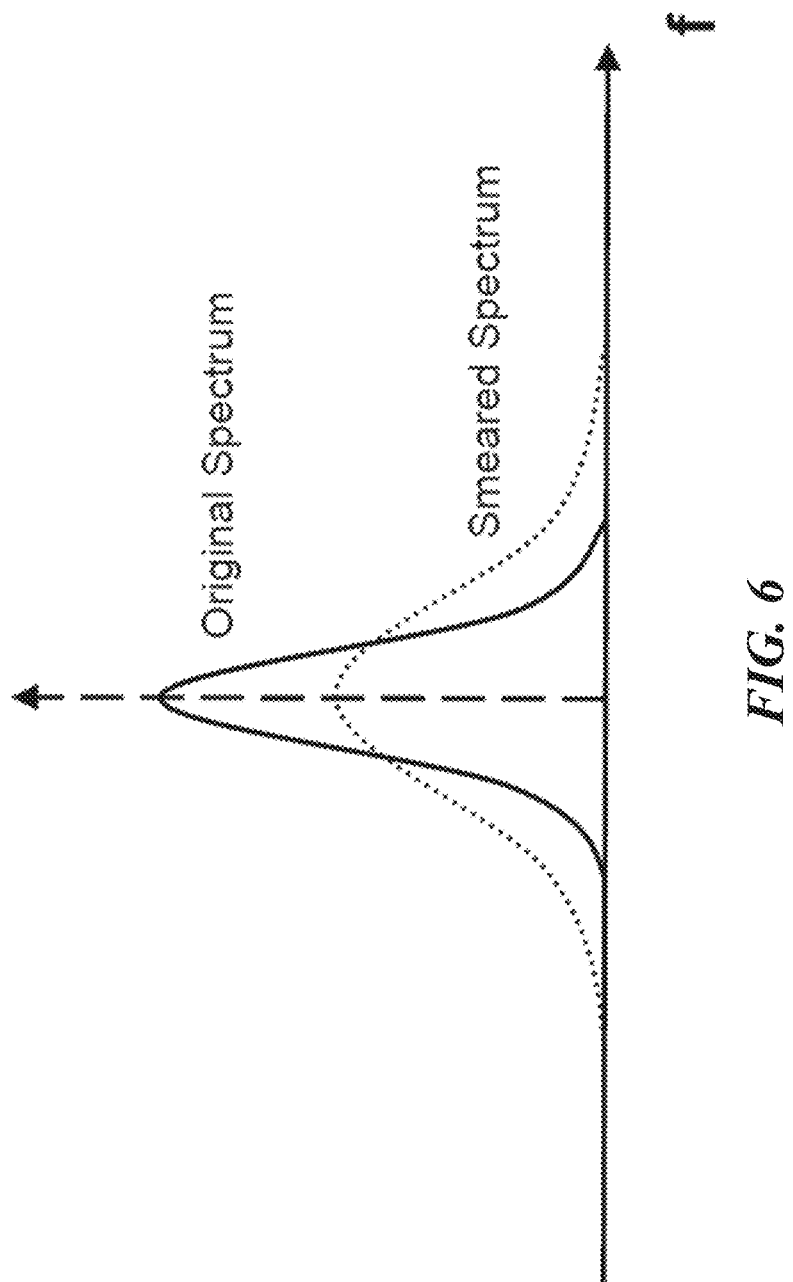
FIG. 6 depicts a smeared spectrum of a subcarrier in a ranging subchannel when the ranging signal is received using a regular OFDM time frame.

FIG. 5 illustrates the timing of regular uplink data signals and ranging signals (with a Guard Period G.P.). In the beginning of a random access attempt, the mobile station is unaware of its round-trip time to the base station. As a result, the arrival time of ranging signal at the base station may be misaligned with other signals which have been synchronized to the base station clock. As depicted in FIG. 5, the random access Ranging Signal does not coincide with the expected arrival time at the base station. As shown in FIG. 6, time misalignment of regular signals and ranging signals can cause spectrum of ranging signals to be smeared when it is received using the OFDM time window of regular signals. Therefore, misaligned subcarriers within a ranging subchannel will interfere with each other and with other data subchannels that are adjacent to them. In the following description, several methods are presented to address such problems.

In one embodiment, the ranging subchannel is composed of multiple blocks of subcarriers. The subcarriers in each block are contiguous in frequency. The signal power of the subcarriers towards the boundary (the lower ends and the higher ends in frequency) of a block is lower than that of the subcarriers towards the center of the block. In a special case, the power levels of the two subcarriers at both ends of a block are set to zero.

In yet another embodiment, each segment of a ranging sequence is a Hadamard sequence and a full ranging sequence is composed of multiple Hadamard sequences. Each segment corresponds to a block of contiguous subcarriers. In Table 1, a typical example is shown for two ranging sequences. Each segment is a 4-bit Hadamard sequence and each ranging sequence is composed of 4 segments. The two ranging sequences are segment-wise orthogonal to each other.

TABLE 1

| Example of ranging sequences | | | | |
|---|---|---|---|---|
| Ranging Sequence 1 | +1 −1 +1 −1 | +1 +1 +1 +1 | +1 +1 −1 −1 | +1 −1 −1 +1 |
| Ranging Sequence 2 | +1 +1 +1 +1 | +1 −1 −1 +1 | +1 −1 +1 −1 | +1 +1 −1 −1 |

Figure 7:
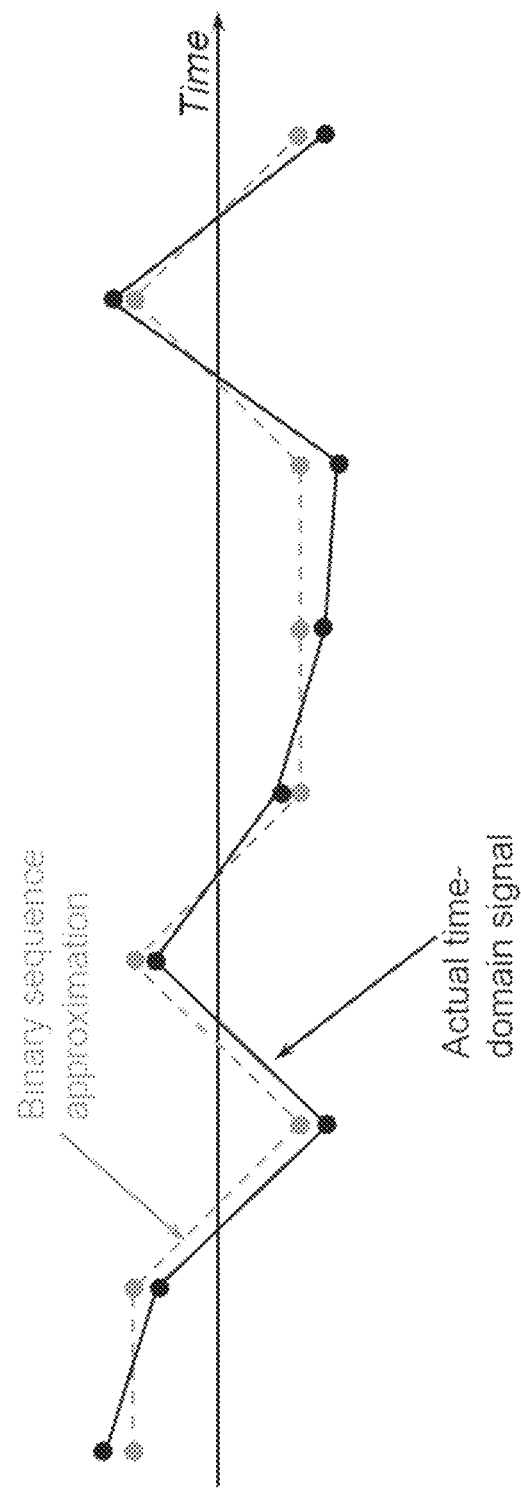
FIG. 7 illustrates a ranging sequence's corresponding time-domain signal that can be approximated with a binary sequence.

In addition, other properties in signal processing can be exploited in sequence design. In one embodiment of the implementation, the ranging sequence is designed such that its corresponding time-domain signal exhibits relatively low peak-to-average power ratio. This improves the power efficiency of the mobile station transmission power amplifier. Furthermore, the ranging signal is designed such that the time signal can be approximated with a binary sequence (e.g., FIG. 7), thereby reducing the complexity of the receiver correlator. While in theory, and even in practice, each modulating digit of a ranging sequence can represent a range of logic levels, a binary format is practically the simplest representation and requires the simplest receiver components for its processing. FIG. 7 illustrates a ranging sequence's corresponding time-domain signal that can be approximated with a binary sequence.

In another embodiment, the blocks of a ranging subchannel can be distributed or allocated in such a way that the autocorrelation of a ranging sequence corresponding to the ranging subchannel, in time-domain, exhibits a set of desired properties such as a narrow main peak and low sidelobes. For example, the blocks can be distributed in the frequency band of interest such that there is minimum redundancy in a co-sampling function. In other words, spacing between the blocks of a ranging subchannel in the frequency domain has no or minimum repetition, as illustrated in FIG. 8, where the spacing consists of the set {d, 2d, 3d, 4d, 5d, 6d}.

Figure 8:
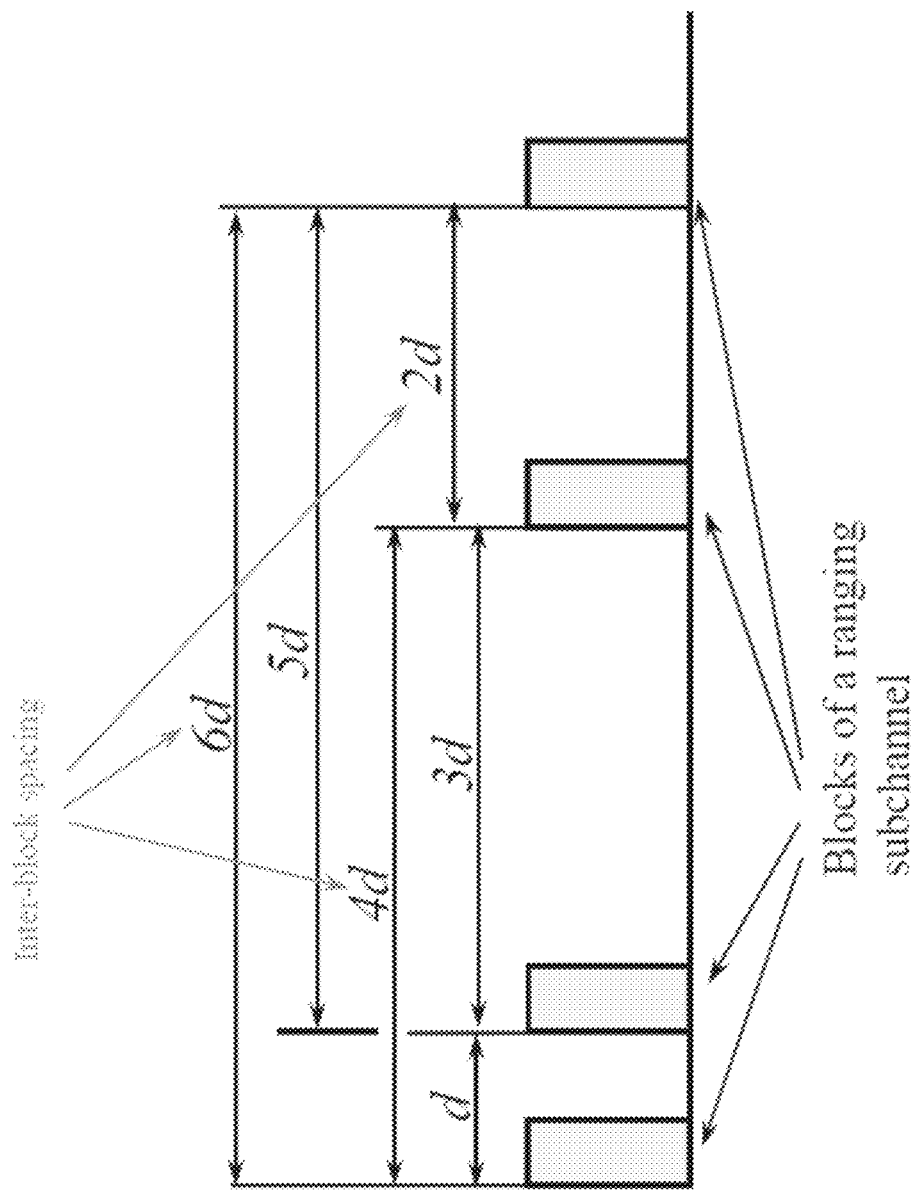
FIG. 8 shows a ranging subchannel arrangement in which spacing between subcarrier blocks in the frequency domain has no, or minimum, repetition.

FIG. 8 is merely an example of such possible arrangements, where an autocorrelation process only produces one major peak, regardless of the ranging sequence carried by the ranging subchannel blocks. During an autocorrelation process, two copies of a ranging signal move in parallel with respect to each other, in a step-wise manner, and at each step the sum of the multiplication of their corresponding values is computed and recorded. Note that in an interval of a ranging subchannel where there are no subcarriers, the ranging signal value is zero. Therefore, employing the proposed arrangements, at any step except for the step during which the two copies of the ranging signal are substantially aligned, most of the non-zero values of either copy will correspond to the zero values of the other copy and the multiplication result of the corresponding values will be zero, which results in low sidelobe values.

With regard to controlling the power settings of a ranging signal, before a random access, a mobile station estimates the path loss from a base station, using the received downlink signal. It uses open-loop power control to set the power level of the ranging signal. In one embodiment, the mobile station adds a negative offset to the open-loop power setting and gradually ramps up the transmission power of the ranging signal as the number of random access failures and retrials increase.

In one embodiment, the base station receiver detects the presence of each ranging signal, its time delay, and its power level through the use of a matched filter, a correlator, or other means in the time domain, the frequency domain, or both.

In another embodiment, when the ranging subchannel is composed of blocks of contiguous subcarriers, the base station performs hierarchical detection: first in frequency domain, then in time domain. The detection process is as follows:
1. The FFT is applied to a selected window of the received time-domain signal, s(t).
2. For a particular ranging subchannel, its received version, $\{\vec{r}(k)\}_{k=1}^{K}$, is correlated in the frequency domain with the ranging sequences associated with the cell, in a segment-wise fashion, where K is the total number of blocks in a ranging subchannel. If the $m^{th}$ sequence associated with the cell is denoted by $\{\vec{b}_m(k)\}_{k=1}^{K}$, the correlation value, $P_m$, is computed by:

$$P_m = \sum_{k=1}^{K} \left| \langle \vec{r}(k) \bullet \vec{b}_m(k) \rangle \right|^2,$$

where the dot-product is computed by:

$$\langle \vec{r}(k) \bullet \vec{b}_m(k) \rangle = \sum_{n=1}^{N} x(k,n) \cdot [c_m(k,n)]^*$$

and where N denotes the number of subcarriers in a block, x(k,n) denotes the received version of the $n^{th}$ subcarrier of the $k^{th}$ block in the given ranging subchannel, and $c_m(k,n)$ represents the value of the $n^{th}$ subcarrier of the $k^{th}$ block in the given ranging subchannel for the $m^{th}$ sequence. It is noted that that both $\vec{r}(k)$ and $\vec{b}_m(k)$ are vectors of the dimension same as the segment length. If $P_m$ is greater than a given threshold, this indicates that a ranging signal corresponding to the $m^{th}$ sequence has been detected.
3. For the ranging signal identified in Step 2, a time-domain correlation of the full sequence of the ranging signal is performed, in a sliding-window fashion, to find the time delay of that ranging signal, that is:

$$C(\tau) = \left| \sum_{t=0}^{T} s(t+\tau) \cdot z^*(t) \right| \text{ for } \tau = 0, 1, \ldots, D$$

where T denotes the length of the time-domain ranging sequence, D corresponds to the maximum time delay allowed by the system, and $z^*(t)$ represents the time-domain signal of the detected ranging sequence. The maximum value of $C(\tau)$ for $\tau=0,1,\ldots,D$ is the estimate of the power of the ranging signal and the corresponding value of $\tau$ indicates the time delay associated with the ranging signal.

In the case of ranging sequences composed of Hadamard sequences, the dot-products of the received signal and the ranging sequence in a particular segment in Step 2 can be evaluated simultaneously using a single Fast Hadamard Transform (FHT), thereby simultaneously detecting multiple ranging sequences.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A mobile station for use in a cellular wireless communication system that uses blocks of consecutive subcarriers for uplink transmission in a frequency domain and uses time slots in a time domain and each time slot includes a plurality of orthogonal frequency division multiplex (OFDM) symbols, the mobile station comprising:
a receiver configured to receive random access configuration information from a base station indicating frequencies of at least one block of subcarriers for random access, wherein the at least one block has a lower frequency end and an upper frequency end; and
a transmitter configured to transmit a random access signal using the at least one block, the random access signal having a sequence, the sequence is transmitted in two or more OFDM symbols, the random access signal having a cyclic prefix at a beginning of the random access signal, and the random access signal having a guard period separating the random access signal from another uplink signal using at least a portion of the at least one block, wherein the at least one block includes at least one guard subcarrier at the lower frequency end that separates the random access signal from another random access signal in a lower, adjacent block of subcarriers, wherein the at least one block includes at least one guard subcarrier at the upper frequency end that separates the random access signal from another random access signal in an upper adjacent block of subcarriers, and wherein the sequence is transmitted in the remaining subcarriers of the at least one block;
the receiver further configured to receive a time advance and a power adjustment from the base station; and
the transmitter configured to transmit an uplink signal in at least one of the blocks having a timing adjusted based on the time advance and a power adjusted based on the power adjustment.

2. The mobile station of claim 1 wherein the random access configuration information includes a plurality of subchannels for random access, wherein one of the subchannels is the at least one block for random access.

3. The mobile station of claim 1 wherein the sequence is a non-binary sequence.

4. The mobile station of claim 1 wherein the at least one block includes multiple subcarriers and the multiple subcarriers are consecutive in the frequency domain.

5. The mobile station of claim 1 wherein the at least one block includes a plurality of blocks that are interleaved with other blocks in the frequency domain.

6. The mobile station of claim 1 wherein the sequence is used to identify the mobile station.

7. The mobile station of claim 1 wherein different base stations have different sequences for random access.

8. A method performed by a mobile station in a cellular wireless communication system that uses blocks of consecutive subcarriers for uplink transmission in a frequency domain and uses time slots in a time domain and each time slot includes a plurality of orthogonal frequency division multiplex (OFDM) symbols, the method comprising:
receiving random access configuration information from a base station indicating frequencies of at least one block of subcarriers for random access, wherein the at least one block has a lower frequency end and an upper frequency end; and
transmitting a random access signal using the at least one block, the random access signal having a sequence, the sequence is transmitted in two or more OFDM symbols, the random access signal having a cyclic prefix at a beginning of the random access signal, and the random access signal having a guard period separating the random access signal from another uplink signal using at least a portion of the at least one block, wherein the at least one block includes at least one guard subcarrier at the lower frequency end that separates the random access signal from another random access signal in a lower, adjacent block of subcarriers, wherein the at least one block includes at least one guard subcarrier at the upper frequency end that separates the random access signal from another random access signal in an upper adjacent block of subcarriers, and wherein the sequence is transmitted in the remaining subcarriers of the at least one block;
receiving a time advance and a power adjustment from the base station; and
transmitting an uplink signal in at least one of the blocks having a timing adjusted based on the time advance and a power adjusted based on the power adjustment.

9. The method of claim 8 wherein the random access configuration information includes a plurality of subchannels for random access, wherein one of the subchannels is the at least one block for random access.

10. The method of claim 8 wherein the sequence is a non-binary sequence.

11. The method of claim 8 wherein the at least one block includes multiple subcarriers and the multiple subcarriers are consecutive in the frequency domain.

12. The method of claim 8 wherein the at least one block includes a plurality of blocks that are interleaved with other blocks in the frequency domain.

13. The method of claim 8 wherein the sequence is used to identify the mobile station.

14. The method of claim 8 wherein different base stations have different sequences for random access.

15. A base station for use in a cellular wireless communication system that uses blocks of consecutive subcarriers for uplink transmission in a frequency domain and uses time slots in a time domain and each time slot includes a plurality of orthogonal frequency division multiplex (OFDM) symbols, the base station comprising:
a transmitter configured to transmit random access configuration information to a mobile station indicating frequencies of at least one block of subcarriers for random access, wherein the at least one block has a lower frequency end and an upper frequency end; and
a receiver configured to receive a random access signal from the mobile station via the at least one block, the random access signal having a sequence, the sequence is transmitted in two or more OFDM symbols, the random access signal having a cyclic prefix at a beginning of the random access signal, and the random access signal having a guard period separating the random access signal from another uplink signal using at least a portion of the at least one block, wherein the at least one block includes at least one guard subcarrier at the lower frequency end that separates the random access signal from another random access signal in a lower, adjacent block of subcarriers, wherein the at least one block includes at least one guard subcarrier at the upper frequency end that separates the random access signal from another random access signal in an upper adjacent block of subcarriers, and wherein the sequence is transmitted in the remaining subcarriers of the at least one block;

the transmitter configured to transmit a time advance and a power adjustment to the mobile station; and the receiver further configured to receive an uplink signal from the mobile station in at least one of the blocks having a timing adjusted based on the time advance and a power adjusted based on the power adjustment.

16. The base station of claim 15 wherein the random access configuration information includes a plurality of subchannels for random access, wherein one of the subchannels is the at least one block for random access.

17. The base station of claim 15 wherein the sequence is a non-binary sequence.

18. The base station of claim 15 wherein the at least one block includes multiple subcarriers and the multiple subcarriers are consecutive in the frequency domain.

19. The base station of claim 15 wherein the at least one block includes a plurality of blocks that are interleaved with other blocks in the frequency domain.

20. The base station of claim 15 wherein the sequence is used to identify the mobile station.

21. The base station of claim 15 wherein different base stations have different sequences for random access.

22. A method performed by a base station for use in a cellular wireless communication system that uses blocks of consecutive subcarriers for uplink transmission in a frequency domain and uses time slots in a time domain and each time slot includes a plurality of orthogonal frequency division multiplex (OFDM) symbols, the base station comprising:

transmitting random access configuration information to a mobile station indicating frequencies of at least one block of subcarriers for random access, wherein the at least one block has a lower frequency end and an upper frequency end; and receiving a random access signal from the mobile station via the at least one block, the random access signal having a sequence, the sequence is transmitted in two or more OFDM symbols, the random access signal having a cyclic prefix at a beginning of the random access signal, and the random access signal having a guard period separating the random access signal from another uplink signal using at least a portion of the at least one block, wherein the at least one block includes at least one guard subcarrier at the lower frequency end that separates the random access signal from another random access signal in a lower, adjacent block of subcarriers, wherein the at least one block includes at least one guard subcarrier at the upper frequency end that separates the random access signal from another random access signal in an upper adjacent block of subcarriers, and wherein the sequence is transmitted in the remaining subcarriers of the at least one block;

transmitting a time advance and a power adjustment to the mobile station; and receiving an uplink signal from the mobile station in at least one of the blocks having a timing adjusted based on the time advance and a power adjusted based on the power adjustment.

23. The method of claim 22 wherein the random access configuration information includes a plurality of subchannels for random access, wherein one of the subchannels is the at least one block for random access.

24. The method of claim 22 wherein the sequence is a non-binary sequence.

25. The method of claim 22 wherein the at least one block includes multiple subcarriers and the multiple subcarriers are consecutive in the frequency domain.

26. The method of claim 22 wherein the at least one block includes a plurality of blocks that are interleaved with other blocks in the frequency domain.

27. The method of claim 22 wherein the sequence is used to identify the mobile station.

28. The method of claim 22 wherein different base stations have different sequences for random access.

* * * * *